(12) United States Patent
Kishima

(10) Patent No.: US 6,592,435 B2
(45) Date of Patent: Jul. 15, 2003

(54) METHOD OF AND APPARATUS FOR MANUFACTURING RECORDING MEDIUM

(75) Inventor: Koichiro Kishima, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/905,443

(22) Filed: Jul. 13, 2001

(65) Prior Publication Data

US 2002/0045411 A1 Apr. 18, 2002

(30) Foreign Application Priority Data

Jul. 17, 2000 (JP) ............................................ 2000-216121

(51) Int. Cl.$^7$ .................................................. B24B 1/00
(52) U.S. Cl. ............................ 451/59; 451/63; 451/303
(58) Field of Search ............................ 451/59, 63, 168, 451/303, 307

(56) References Cited

U.S. PATENT DOCUMENTS

| 4,347,689 A | * | 9/1982 | Hammond | .................. 451/307 |
|---|---|---|---|---|
| 4,514,937 A | * | 5/1985 | Gehrung et al. | ............. 451/163 |
| 4,656,790 A | * | 4/1987 | Mukai et al. | .................. 451/28 |
| 4,845,816 A | * | 7/1989 | Nanis | ........................ 29/90.01 |
| 5,431,592 A | * | 7/1995 | Nakata | ........................ 451/296 |
| 6,283,838 B1 | * | 9/2001 | Blake et al. | ................. 451/168 |

FOREIGN PATENT DOCUMENTS

| JP | 62277259 | * | 12/1987 | .................. 451/63 |
|---|---|---|---|---|
| JP | 10-244452 | * | 9/1998 | .................. 451/63 |

* cited by examiner

Primary Examiner—M. Rachuba
(74) Attorney, Agent, or Firm—Sonnenschein, Nath & Rosenthal

(57) ABSTRACT

In a recording medium manufacturing method for obtaining a recording medium by effecting a surface smoothing treatment on a surface smoothing treatment surface of a surface of a medium, the surface smoothing treatment surface of the medium is locally pressed by a polishing work tape having a pressure area less than 1 mm, more preferably, less than 0.5 mm with respect to both radial direction and tangential direction relative to rotation of the medium. In a polishing work of recording medium manufacturing process, a problem of occurrence of defects such as scratches on the surface layer can be improved, whereby yield can be increased and mass-productivity can be improved.

14 Claims, 3 Drawing Sheets

METHOD OF AND APPARATUS FOR MANUFACTURING RECORDING MEDIUM

RELATED APPLICATION DATA

The present application claims priority to Japanese Application No. P2000-216121 filed Jul. 17, 2000, which application is incorporated herein by reference to the extent permitted by law.

BACKGROUND OF THE INVENTION

1. Field of the Invention

The present invention relates to method of and apparatus for manufacturing various recording mediums such as a magnetic recording medium and an optical recording mediums for example.

2. Description of the Related Art

A recording density in an optical recording medium, for examples generally depends upon a diameter of a spot of laser beam A recording density becomes able to increase as the diameter of the spot of laser beam decreases. The diameter of the spot of laser beam is proportional to $\lambda/NA$ where $\lambda$ represents the wavelength of laser beam and NA represents the numerical aperture of objective lens. Accordingly, in order to increase the recording density of the optical recording medium, it is requested that NA should be increased by reducing the wavelength of laser beam.

In recent years, TeraStor Corporation has proposed a near-field optical disk in which a distance between an optical disk and an optical lens is under 200 nm as a method of increasing NA. Further, Quinta Corporation has proposed an optical hard disk in which an optical lens is mounted on a slider and a distance between the optical disk and the slider is less than 100 nm, or the like.

As the space between the optical system and the recording medium is reduced as described above, it is requested that the surface of the optical recording medium should be formed as a highly-smooth surface.

As the NA of the optical system increases, the pitch or the track width should be reduced more with respect to the tracking direction.

In the existing optical disk manufacturing methods, it is customary that very small concavities and convexities on the surface to construct recording pits or tracking guide grooves of the optical disk are formed by injection molding at the same time the substrate of the optical disk is molded Also in this case, the surface of the optical disk is treated by smoothing processing.

When the surface of the magnetic recording medium incorporated in a conventional hard disk apparatus is finished, as shown in a schematic perspective view of FIG. 1, a medium 40 is rotated at high speed in the direction shown by an arrow a with respect to the axis perpendicular to the surface treated by surface smoothing processing (this surface will hereinafter be referred to as a "surface smoothing treatment surface"). On the other hand, a polishing work tape 41 is moved in the direction shown by an arrow b along the rotational direction of the medium 40 at linear velocity sufficiently lower than rotational linear velocity of the medium 40 while its polishing material surface is located in the vicinity of the surface smoothing treatment surface.

Then, a pressure roller 42 whose axis direction is located in the radial direction presses the surface smoothing treatment surface from above this polishing work tape 41.

Although this pressure roller 42 is rotated as the polishing work tape 41 is moved, its rotary axis is prevented from being moved. In this case, a pressure area 43 in which the medium 40 is pressed by the polishing work tape 41 becomes a straight area presented along the axial direction of the pressure roller 42.

This straight pressure area 43 is extended over the whole area along the radial direction of the medium 40 that should be treated by surface polishing process.

In the recording medium whose surface has been smoothed by the above method, i.e., concavities and convexities have been removed from the surface of the recording medium, the surface of the recording medium can be smoothed to an extent that its so-called glide height is made less than 100 nm e.g., about 30 nm.

However according to the above method, as FIG. 2 shows the state in which the polishing work tape 41 is pressing the medium 40, when a protrusion 44 is existing on the side of the polishing work tape 41 or when a hard foreign substance is caught in the polishing work tape 41, a scratch 45 occurs on the surface smoothing treatment surface 3 due to the protrusion 44 or the hard foreign substance.

Having studied and considered the occurrence of the scratch 45, the assignee of the present application clarified that the occurrence of the scratch 45 considerably depends upon the pressed state of the polishing work tape 41.

Specifically, as described above, when the straight pressure area 43 is formed by the pressure roller 42, the pressure area 43 is formed over a wide range in the radial direction of the medium 40. Accordingly, as shown by an arrow c in FIG. 2, since substantially uniform pushing force is given to the whole area of the pressure area 43, this pushing force is concentrated on the tip end in which the protrusion 44 protruded toward the surface smoothing treatment surface 3 or the caught foreign substance is butted against the surface smoothing treatment surface 3.

The assignee of the present application has clarified that the surface smoothing treatment surface tends to be scratched due to the above reason.

SUMMARY OF THE INVENTION

In view of the aforesaid aspect, it is an object of the present invention to provide method of and apparatus for manufacturing recording medium in which occurrence of scratches can be avoided effectively.

It is another object of the present invention to provide method of and apparatus for manufacturing recording medium in which highly-reliable recording mediums can be obtained.

According to an aspect of the present invention, there is provided a recording medium manufacturing method of providing a recording medium by treating a medium surface in a surface smoothing process. This recording medium manufacturing method is comprised of the steps of rotating the medium about an axis perpendicular to a surface which is treated by the surface smoothing process, smoothing the surface smoothing treatment surface of the medium by slidably contacting a polishing work tape with the surface smoothing treatment surface with partial pressure and selecting the partial pressure at very small area.

In particular, according to the present invention, the partial pressure area is selected to be less than 1 mm, more preferably, 0.5 mm with respect to both radial direction and tangential direction relative to rotation of the medium.

In accordance with another aspect of the present inventions there is provided a recording medium manufacturing apparatus for providing a recording medium by processing a medium surface by a surface smoothing treatment. This recording medium manufacturing apparatus is comprised of rotating means for rotating the medium about an axis perpendicular to a surface on which the surface smoothing treatment is effected, a polishing work tape and pressure means for partly pressing the polishing work tape against the surface smoothing treatment surface of the medium, wherein a partial pressure area provided by the pressure means is selected to be less than 1 mm with respect to both of radial direction and tangential direction relative to rotation of the medium.

In particular, the partial pressure area provided by the pressure means is selected to be less than 1 mm, more preferably, less than 0.5 mm with respect to both of radial direction and tangential direction relative to rotation of the medium.

As described above, since the pressure area in which the polishing work tape presses the surface of the medium is specified, occurrence of scratches can be decreased considerably.

DESCRIPTION OF THE PREFERRED EMBODIMENT

The present invention will now be described with reference to the accompanying drawings.

A recording medium obtained according to the present invention can be applied to a magnetic recording medium incorporated in a hard disk apparatus or an optical recording medium, i.e., an optical recording medium in which near-field recording and reproduction in which a distance between it and an optical system for either recording or reproducing information with irradiation of light, for example, is less than 200 nm are carried out or the like, for example. By way of example, the present invention can be applied to the manufacturing method of manufacturing various recording mediums such as an optical recording medium having at least a recording layer, e.g., a phase change type optical recording medium, a magneto-optical recording medium effectively utilizing magnetooptic effect and a dye recording medium including a dye recording layer.

The recording medium obtained according to the present invention is not limited to a disk-like recording medium, and the present invention can be applied to various types of recording mediums such as a card-like recording medium and a sheet-like recording medium.

Figure 1:
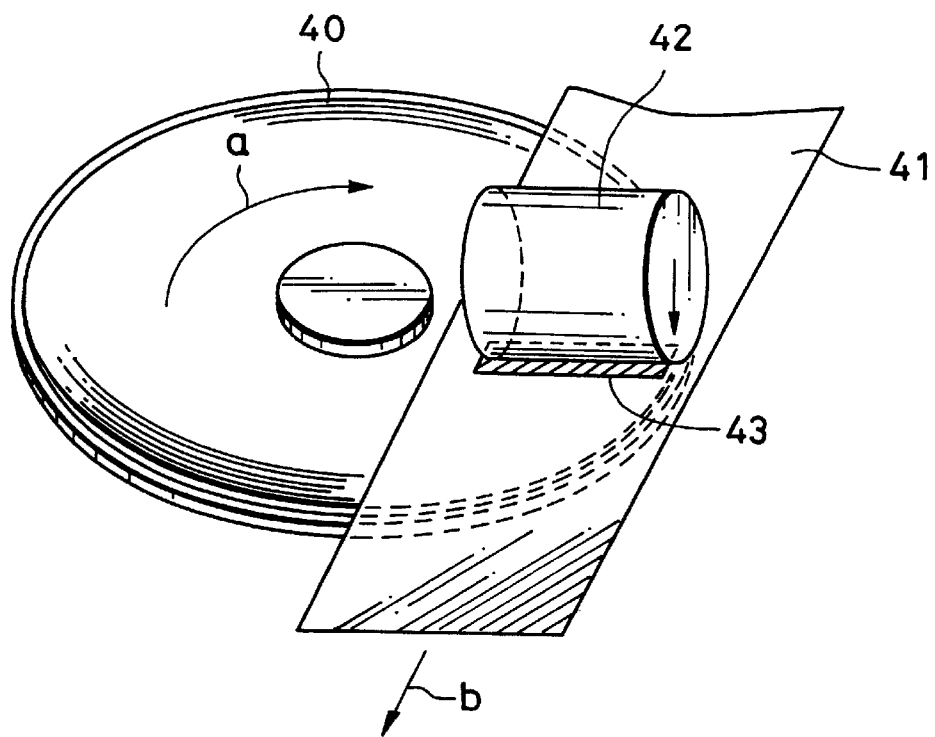
FIG. 1 is a schematic perspective view to which reference will be made in explaining a conventional method of finishing the surface of a magnetic recording medium.
Figure 2:
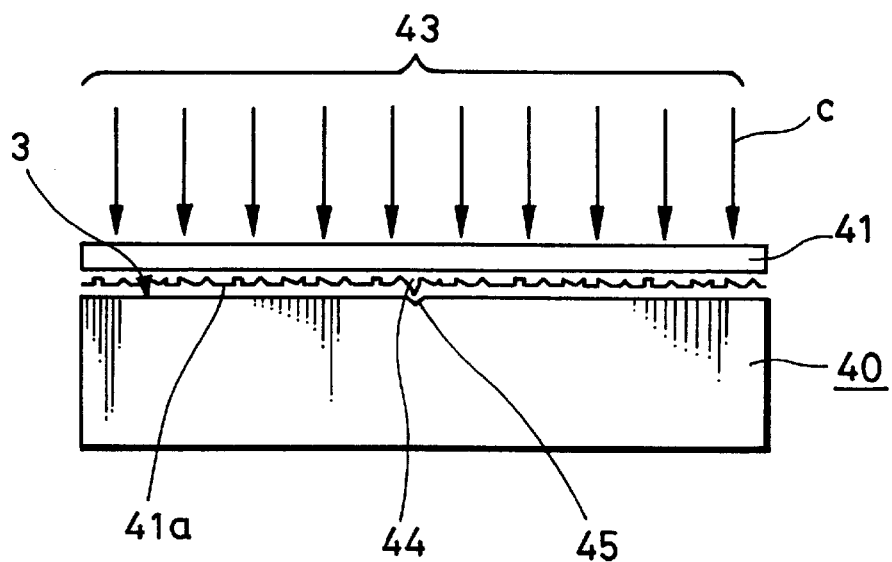
FIG. 2 is a schematic cross-sectional view to which reference will be made in explaining a conventional method and illustrates the state in which a medium is pressed by a polishing work tape.
Figure 3:
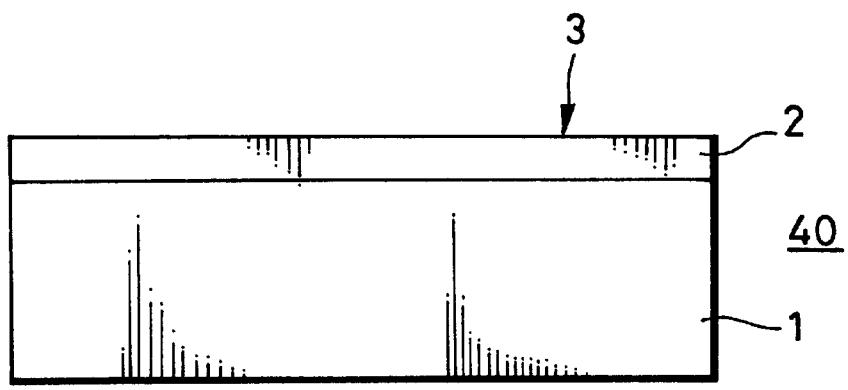
FIG. 3 is a schematic cross-sectional view showing an example of a recording medium to which the present invention is applied.

FIG. 3 is a schematic cross-sectional view of a medium 40 comprising a target recording medium As shown in FIG. 3, this recording medium 40 includes a substrate, e.g., substrate made of a resin substrate made of polycarbonate (PC), or polyether sulfone (PES), or polyether imide (PEI) and the like or a glass substrate on which there is deposited a recording layer, e.g., various material layers 2 such as a magnetic recording layer, an optical recording layer and a surface protecting layer. The surface of the recording layer 2 is formed as a surface smoothing treatment surface 3. A target recording medium can be constructed by smoothing this surface smoothing treatment surface 3.

An embodiment in which a target recording medium is obtained by smoothing the surface smoothing treatment surface 3 of the medium 40 shown in FIG. 3, for example, by the manufacturing method according to the present invention will be described with reference to an example of an optical recording medium manufacturing apparatus according to the present invention.

Figure 4:
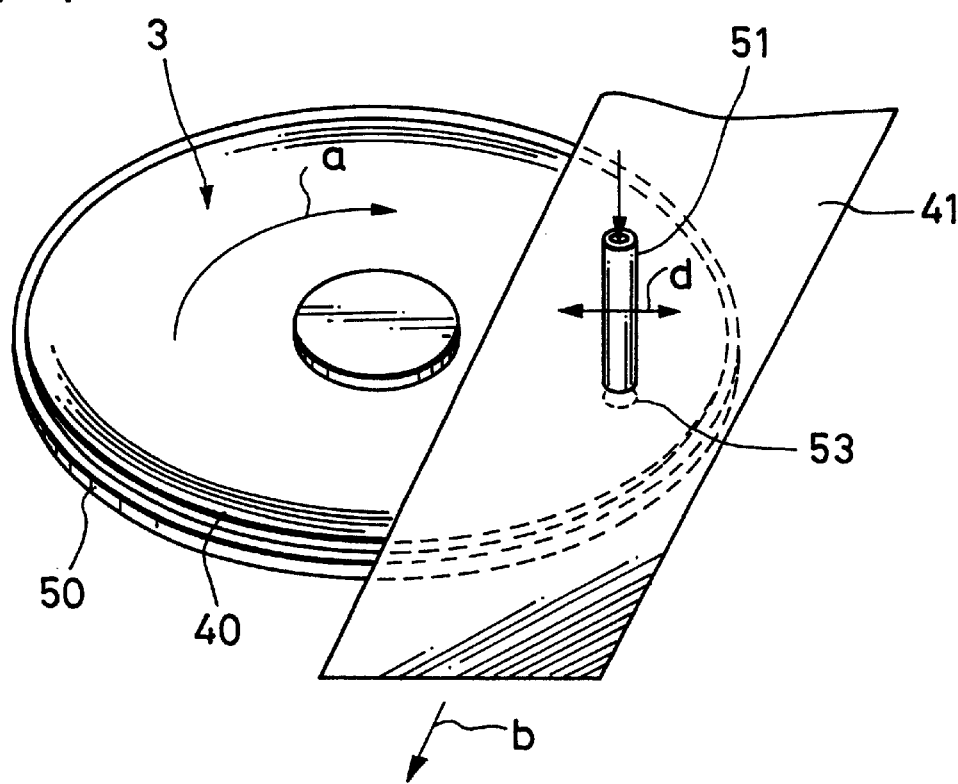
FIG. 4 is a schematic perspective view showing an example of a manufacturing apparatus according to the present invention.

FIG. 4 is a schematic perspective view showing an example of an apparatus according to the present invention.

The apparatus according to the present invention includes a rotating means 50 for rotating the medium 40 about an axis perpendicular to the surface smoothing treatment surface 3, a polishing work tape 41 and a pressure means 51 for partly urging this polishing work tape 41 against the surface smoothing treatment surface 3 of the medium 40.

Then, a partial pressure area 53 of the pressure means 51, in particular, becomes less than 1 mm, more preferably, less than 0.5 mm with respect to both the radial direction and the tangential direction relative to rotation of the medium 40.

The rotating means 50 includes a rotating stage 50 rotated by a drive motor, not shown, to rotate the medium 40 in the direction shown by an arrow a in FIG. 4.

The pressure means 51 is comprised of an air nozzle for jetting gas, e.g., air. This air nozzle 51 is comprised of a nozzle having an inner diameter of 2 mm, for example, and is located with a distance of 400 $\mu$m between it and the surface smoothing treatment surface 3 of the medium 40. As a consequence, the size of the pressure area 53 of the polishing work tape 41 relative to the surface smoothing treatment surface 3 can be made less than 1 mm with respect to both the above radial direction and tangential direction.

The polishing work tape 41 is a tape-like polishing sheet ranging from #5000 to #15000 whose principal component is alumina $Al_2O_3$ or green carbide Then, this polishing work tape 41 is moved in the tangential direction of the rotation of the medium 40 along the same direction of the rotation of the medium 40 as shown by an arrow b in FIG. 4. At that time, the medium 40 is rotated at high speed and its linear velocity is selected to be sufficiently higher than the speed at which the polishing work tape 41 is being moved, Then, as described above, air is jetted from the pressure means 51, i.e., the air nozzle in this embodiment over the polishing work tape 41, whereby the polishing work tape 41 is urged against the surface smoothing treatment surface 3 of the medium 40 with pressure. In this case, the pressure means 51 is moved in a reciprocative fashion in the radial direction of the medium 40 as shown by an arrow d in FIG. 4.

With the above arrangement, the surface smoothing treatment surface 3 and the polishing work tape 41 are slidably contacted with each other at its pressure area 53, thereby resulting in the surface smoothing treatment surface 3 being polished.

Thus, the occurrence of defects such as scratches caused by polishing can be suppressed effectively so that the surface smoothing treatment surface 3 can be polished, i.e., this surface smoothing treatment surface 3 can be smoothened satisfactorily.

Figure 5:
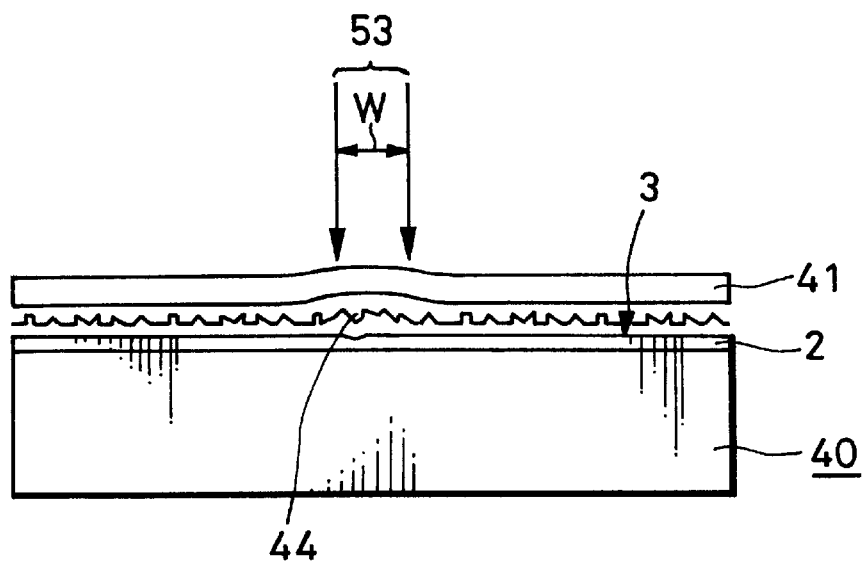
FIG. 5 is a schematic cross-sectional view to which reference will be made in explaining the present invention and illustrates the state in which the surface of a recording medium is polished.

The reason that the occurrence of defects such as scratches can be avoided effectively will be described below, As FIG. 5 shows a schematic cross-sectional view of a polished portion, according to the present invention, since the pressure area 53 is made small, in particular, less than 1 mm in the radial direction and in the tangential direction, i.e., less than 1 mm$^2$, the whole pressure force of this pressure area 53 is decreased to an extent that this small area can be polished If a protrusion 44 exists on the polished surface of the polishing work tape 41 within this pressure area 53, then only small pressure force applied to the extremely nearest portion is applied to this protrusion 44. As a result, contact pressure of the tip end of this protrusion 44 with the surface smoothing treatment surface 3 can be decreased. Accordingly, concentration of pressure force applied to the protrusion or foreign substance can be suppressed so that the occurrence of scratches can be avoided or decreased.

Figure 6:
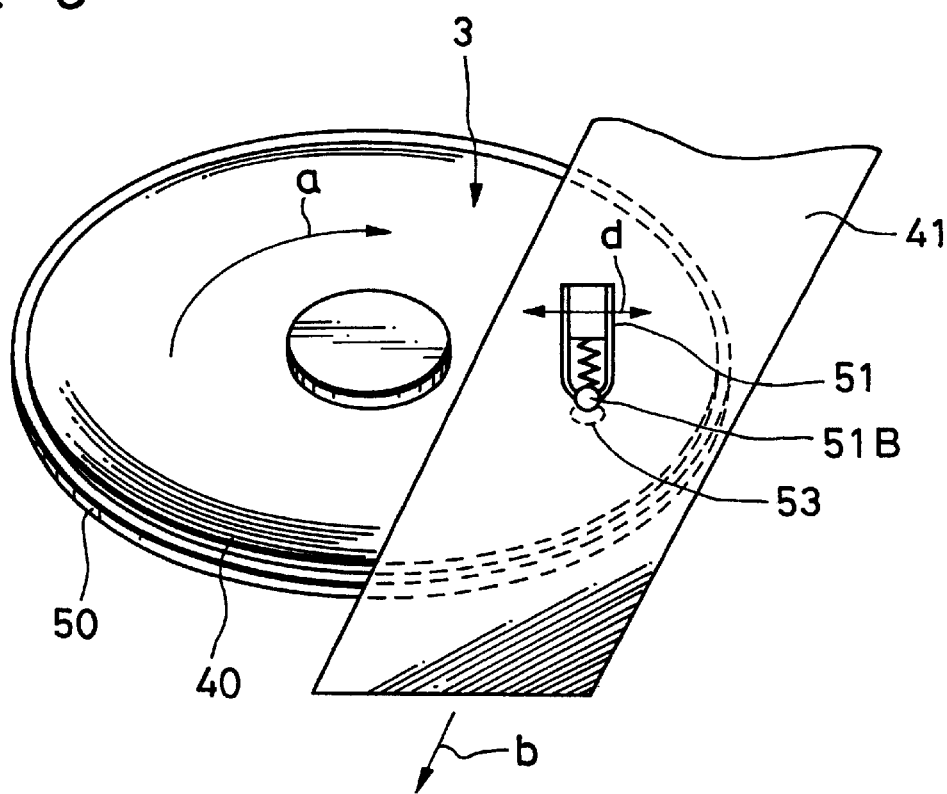
FIG. 6 is a schematic perspective view showing another example of a manufacturing apparatus according to the present invention.

While the pressure-means 51 forming the very small pressure area 53 is comprised of the air nozzle as described above, the present invention is not limited thereto and the pressure means 51 can be formed as a pressure means comprised of a very small roller 51 as shown in FIG. 6. This very small roller 51 can be rotated with respect to two axes or more perpendicular to the rotation center axis of the surface smoothing treatment surface 3 and which are perpendicular to each other. This roller 51 can be formed as a ball-point structure, for example. Specifically, a very small ball 51B is disposed at a narrow portion of a cylindrical tip end and thereby rotatably supported with respect to two axes or more, i.e., so-called infinite axes.

The pressure means is not limited to the above example and can take various arrangements such as a platen-like pressure means.

The very small pressure area 53 is not limited to the single very small pressure area and there may be formed a large number of very small pressure areas, for example. In this case, although all or part of a number of very small pressure areas are randomly arrayed in the tangential direction so that all of very small pressure areas can be prevented from being disposed on the same radial line, when the surface smoothing treatment surface 3 is rotated by a plurality of very small pressure areas, the very small pressure areas are arrayed over the whole width of the radial direction so that the movement of the pressure means along the radial direction can be avoided or decreased.

Accordingly, with this arrangement, a work time can be improved.

While the medium 40 is rotated at high speed, a magnitude of linear velocity is changed in the outer periphery and the inner periphery of the medium 40 as the size of the medium 40 increases. Accordingly, in the above air nozzle, if pressure force is increased in response to the linear velocity, i.e., in the outer peripheral direction in which the linear velocity increases by changing the pressure of supplied gas and the amount of supplied gas or the like, then uniform pressure force can be applied to each portion.

As described above, according to the present invention, there can be constructed a recording medium in which occurrence of defects such as scratches in various recording mediums such as an optical recording mediums a magnetic recording medium and a hard disk can be improved effectively.

In the apparatus according to the present invention, to be more concrete, when green carbide of #10000 is used as a work sheet for a sample medium having a surface smoothing treatment surface made of nitride silicon, five samples (sample mediums) can be finished without causing any scratches by selecting the size of the pressure area to be less than 1 mm with respect to both of the radial direction and the tangential direction.

According to the conventional method, scratches were produced in about 1 to 2 sample mediums when five sample mediums were finished. Further according to the method of the present invention in which the size of the pressure area is selected to be less than 0.5 mm with respect to both of the radial direction and the tangential direction when green carbide of #10000 is used as a work sheet for a sample medium having a surface smoothing treatment surface made of oxide silicon, five sample mediums can be similarly finished without causing any scratches. On the other hand, according to the conventional method, when the material of the finished surface is relatively soft, scratches are produced in almost all of five finished sample mediums.

As described above, according to the method of the present invention, in various recording mediums, since the recording medium in which occurrence of defects such as scratches is improved effectively can be constructed, there can be obtained a highly-reliable recording medium.

According to the apparatus of the present invention, since the polishing work tape has a specified small area on the surface smoothing treatment surface of the medium i.e., the apparatus includes the pressure means for producing the pressure area less than 1 mm, preferably, less than 0.5 mm, occurrence of scratches can be improved, whereby yield can be increased and mass-productivity can be increased.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A method of making a recording medium by subjecting a medium surface to a surface smoothing process, the method comprising the steps of:

rotating said medium about an axis perpendicular to said medium surface which is to be treated by said surface smoothing process;

smoothing said surface of said medium by putting said surface in sliding contact with a polishing work tape; and applying a partial pressure by a partial pressure means to cause said surface and said tape to experience a relative partial pressure between them at a partial pressure area;

a width of said polishing work tape being larger than said partial pressure means; and said partial pressure area being less than 1 mm with respect to both a radial direction and a tangential direction relative to rotation of said medium.

2. A recording medium manufacturing method according to claim 1, wherein said partial pressure area is selected to be less than 0.5 mm with respect to both radial direction and tangential direction relative to rotation of said medium.

3. A recording medium manufacturing method according to claim 1, wherein said surface smoothing treatment surface of said medium is smoothed by partial pressure of said polishing work tape while said polishing work tape is being moved.

4. The method according to claim 1, wherein said partial pressure means comprises a gas jet nozzle.

5. The method according to claim 1, wherein said partial pressure means comprises a roller.

6. The method according to claim 1, wherein said partial pressure means comprises a ball which is rotatably supported at an end of a member.

7. The method of claim 1, wherein said partial pressure is adjusted in response to the position of said surface smoothing treatment surface of said medium.

8. The method of claim 1, wherein there are provided a plurality of said partial pressure areas.

9. An apparatus for making a recording medium by subjecting a medium surface to a surface smoothing treatment, comprising:

rotating means for rotating said medium about an axis perpendicular to a surface which is subjected to said surface smoothing treatment;

a polishing work tape; and pressure means for pressing said polishing work tape against said medium surface, wherein, a width of said polishing work tape is larger than a corresponding width of said pressure means, and a partial pressure area provided by said pressure means is selected to be less than 1 mm with respect to both of a radial direction and a tangential direction relative to rotation of said medium.

10. A recording medium manufacturing apparatus according to claim 9, wherein said partial pressure area provided by said pressure means is selected to be less than 0.5 mm with respect to both of radial direction and tangential direction relative to rotation of said medium.

11. A recording medium manufacturing apparatus according to claim 9, wherein said pressure means is comprised of a gas jet nozzle.

12. A recording medium manufacturing apparatus according to claim 9, wherein said pressure means is comprised of a roller.

13. The apparatus according to claim 9, wherein said pressure means comprises a roller which rotates along said surface smoothing treatment surface of said medium about two axes or more perpendicular to each other.

14. A recording medium manufacturing apparatus according to claim 9, wherein said pressure means is adjusted in response to the position of said surface smoothing treatment surface of said medium.

* * * * *